(12) United States Patent
Tanada

(10) Patent No.: US 7,161,900 B2
(45) Date of Patent: Jan. 9, 2007

(54) REDUNDANT ETHERNET TRANSMISSION LINE SYSTEM

(75) Inventor: Toru Tanada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 931 days.

(21) Appl. No.: 10/098,888

(22) Filed: Mar. 14, 2002

(65) Prior Publication Data

US 2003/0035368 A1 Feb. 20, 2003

(30) Foreign Application Priority Data

Aug. 17, 2001 (JP) ............................. 2001-247586

(51) Int. Cl.
*G01R 31/08* (2006.01)
(52) U.S. Cl. ....................... 370/225; 370/392; 370/401
(58) Field of Classification Search ...................... None
See application file for complete search history.

(56) References Cited

U.S. PATENT DOCUMENTS 5,983,360 A * 11/1999 Ugajin .......................... 714/11
6,751,191 B1 * 6/2004 Kanekar et al. ............. 370/217
6,941,486 B1 * 9/2005 Kopp et al. ..................... 714/4

FOREIGN PATENT DOCUMENTS

| JP | 11-331231 | 11/1999 |
|---|---|---|
| JP | 2000-4231 | 1/2000 |
| JP | 2000-124907 | 4/2000 |

OTHER PUBLICATIONS

"Part 3: Media Access Control (MAC) Bridges", ANSI/IEEE Std 802.1D, 1998 Edition, pp.cover,iv-vi, & 32-33.*

* cited by examiner

*Primary Examiner*—Chau Nguyen
*Assistant Examiner*—Jung Park
(74) *Attorney, Agent, or Firm*—Katten Muchin Rosenman LLP

(57) ABSTRACT

A system is disclosed to switch over redundant Ethernet transmission lines using link status control, as decreasing software intervention required for the transmission and reception of control frames, etc. The system includes Ethernet transmission lines having redundant configuration, first and second transmission equipment being connected through the Ethernet transmission lines. An Ethernet switch provided in the first transmission equipment learns a route configuration from the frames transmitted from the first and the second transmission equipment. Switchover of the active transmission line is performed using the learned information on the route configuration.

4 Claims, 13 Drawing Sheets

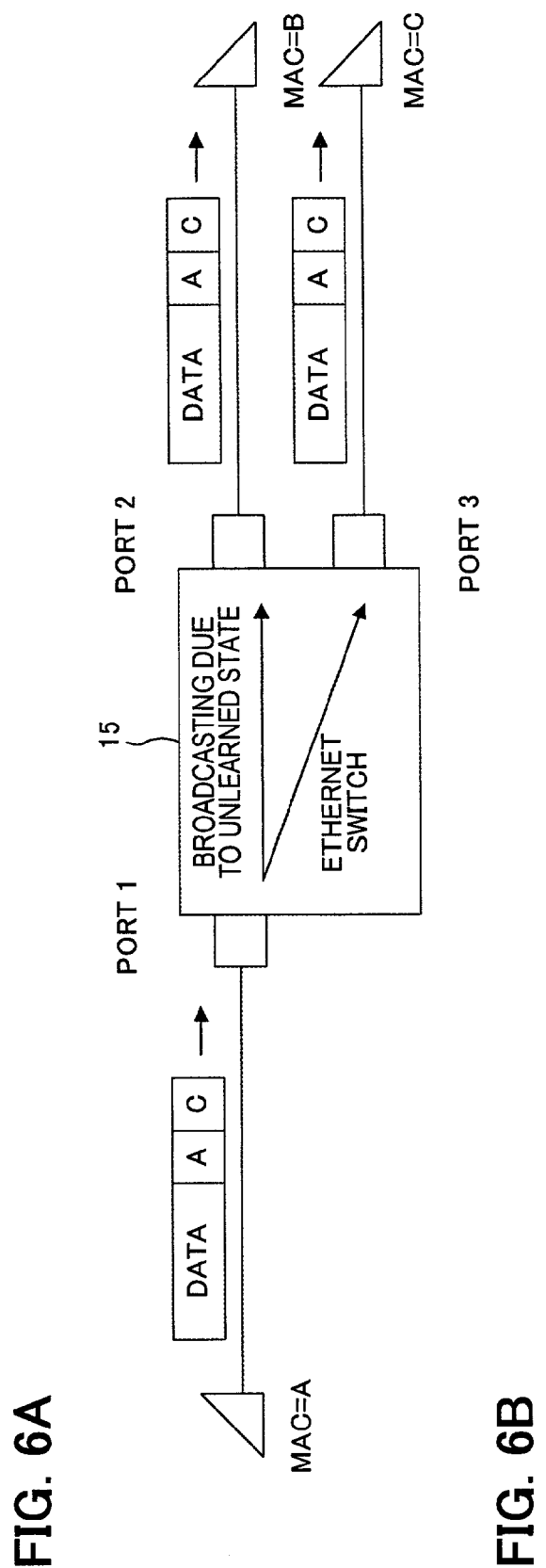

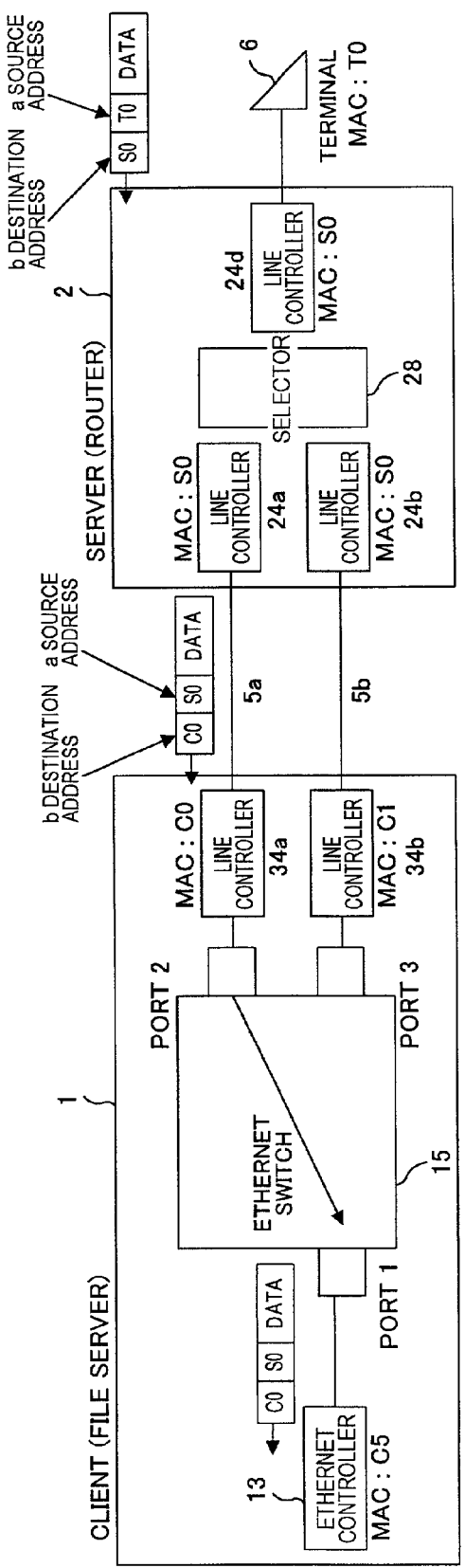

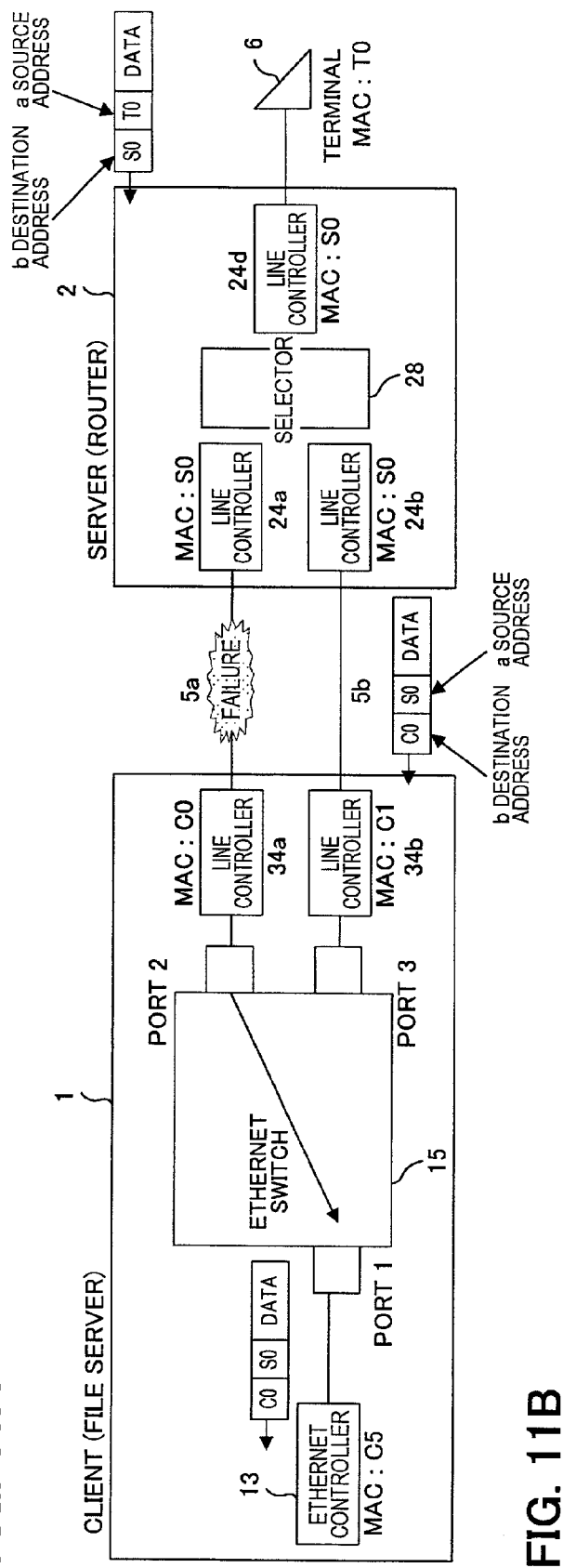

REDUNDANT ETHERNET TRANSMISSION LINE SYSTEM

FIELD OF THE INVENTION

The present invention relates to a redundant Ethernet transmission line system and more particularly a redundant system which enables to switch over the transmission lines having redundant configuration in a short time when a transmission line fails.

BACKGROUND OF THE INVENTION

In recent years, client server systems which connect point-to-point between a client and a server using an Ethernet transmission line are increasing in number. In such a system generally a large amount of data traffic flows on the transmission line. It is therefore required to employ redundant transmission line configuration capable of switching over the lines within a short time.

In FIG. 1, there is shown an example of a block diagram of a conventional client server system having a redundant system configuration of an Ethernet transmission line. A client system 1 is connected to duplicated Ethernet transmission lines 5a, 5b through line controllers 34a, 34b.

Further, client system 1 is provided with Ethernet controllers 33a, 33b each corresponding to a transmission line. The identical Ethernet controller 33a or 33b controls both a control frame directed to a CPU 31 and a data frame directed to an input/output controller 36 being connected to an input/output unit such as a disk unit 4. Client system 1 further includes a memory 32 for buffering data.

Meanwhile, a server system 2 is provided with equipment controller 20, a plurality of Ethernet interface controllers 30a, 30b. Equipment controller 20 further includes CPU 21, memory 22, Ethernet controller 23, network processor 25 and switch 26.

Switch 26 is set by network processor 25 so as to select Ethernet interface controllers 30a, 30b for connecting to an appropriate route.

In the example shown in FIG. 1, interface controller 30a is connected to client system 1, and interface controller 30b is connected to a terminal 6 through an IP (Internet protocol) network 3. Moreover, interface controllers 30a and 30b are mutually connected through switch 26. Thus terminal 6 can access dick unit 4 through server system 2 functioning as a router and client system 1 functioning as a file server.

Each Ethernet interface controllers 30a, 30b is provided with line controllers 24a, 24b being connected to the duplicated Ethernet transmission line, a selector 28 for selectively connecting either of line controllers 24a, 24b, a network processor 29 for controlling selector 28, and a memory 27.

In FIG. 1, CPU 31 in client system 1 distinguishes the aforementioned data frame from the control frame using data higher than the MAC (media access control) layer. Control frames are transmitted and received between CPU 31 and CPU 21 through either a transmission line in operation (hereafter referred to as active transmission line) or a transmission line not in operation (hereafter referred to as standby transmission line. In the example shown in FIG. 1, Ethernet transmission line 5a is the active line.) The switchover of the transmission line caused by a failure is carried out either by a switchover command included in a control frame or by control frame timeout.

In FIG. 2, there is shown a sequence flow chart in a conventional client server system. The figure illustrates a general procedure performed by software both in CPU 31 of client system 1 and in CPU 21 of server system 2.

In client system 1, line controllers 34a, 34b read out the contents of a non-illustrated fault register provided in line controllers 34a, 34b (procedure P1), and determine whether there is a failure on an active line, and whether there is a failure on a standby line for switchover (procedure P2).

In the case there is a failure in working Ethernet transmission line 5a, and there is no failure in standby Ethernet transmission line for switchover 5b (procedure P2; Yes), a transmission line switchover request is sent to server system 2 through Ethernet transmission line 5b using a control frame (procedure P3). The frame format conforms to IEEE 802.3 standard established by the IEEE 802 Committee, or the like.

In server system 2, a control frame received by line controller 24b is analyzed (procedure P4).

Through this control frame analysis, if the line switchover request is recognized and there is no failure on the standby line for switchover (procedure P5; Yes), a response to the line switchover request is sent to client system 1 (procedure P6).

On receiving the response of the line switchover request from server system 2, client system 1 analyzes a received control frame (procedure P7). If a received response corresponds to the line switchover request and there is no failure on the standby line for switchover (procedure P8), client system 1 send a request for performing the switchover (procedure P9).

Server system 2 analyzes the received control frame (procedure P10), and recognizes the request for performing the switchover and there is no failure on the standby line for switchover (procedure P11; Yes), and performs the switchover the operation condition of the transmission line (procedure P12).

Server system 2 then informs client system 1 of the completion of switchover (procedure P13). Client system 1 analyzes the received frame (procedure P14) and recognizes the response of the switchover. If there is no failure on the line to be switched over (procedure P15; Yes), client system 1 switches the active transmission line to be consistent with server system 2 (procedure P16).

Thus, in a conventional system, the switchover of the active line to standby and vise versa is performed by transmitting and receiving a control frame between client system 1 and server system 2, using a line having no failure at the time of switchover.

There are the following problems in such a conventional system. First, as mentioned above, both data frames directed to input/output controller 36 and control frames directed to CPU 31 are controlled by the identical Ethernet controller 33a (33b) in client system 1 shown in FIG. 1.

CPU 31 distinguishes control frames from data frames by determining control information in each frame higher than the MAC layer. Therefore, when there are large data frame traffic directed to input/output controller 36, delay may arise in processing control frames in CPU 1. When the situation is worse, this may possibly be misidentified as communication failure.

Another problem in the conventional system is that when performing the switchover control, a complicated sequence processing is required in CPU 31, as shown in FIG. 2. Further, because the conventional switchover control requires information transmission and reception between the server and the client, and in some cases the switchover control is started after the timeout of the control frame, it takes a substantial time for switchover procedure.

SUMMARY OF THE INVENTION

It is therefore an object of the present invention to provide a redundant Ethernet transmission line system which enables to reduce the intervention of software for the transmission and reception of control frames, etc., more particularly to provide a switchover control of the redundant Ethernet transmission lines in the event of failure, using link status of Ethernet transmission lines instead of control frame transmission and reception.

It is another object of the present invention to provide a redundant Ethernet transmission line system which enables to reduce switchover time by employing an Ethernet switch having a route learning function in a client system. Using such configuration, transmission line switchover is started instantly triggered by a frame transmission, without requiring control frame transmission and reception.

As a first aspect of the present invention to solve the aforementioned problems, preferably a redundant Ethernet transmission line system includes Ethernet transmission lines having a redundant configuration; and first and second transmission equipment respectively connected to the redundant Ethernet transmission lines. The first transmission equipment further includes an Ethernet switch for switching over an active transmission line by learning a frame transmission route from the second transmission equipment to the first transmission equipment using a destination address contained in the frame.

As a second aspect of the present invention, in the redundant Ethernet transmission line system according to the above-mentioned first aspect, preferably the second transmission equipment further includes a selector. When an abnormal condition of the active transmission line is detected by the first transmission equipment and is reported to the second transmission equipment, the selector switches over from the abnormal active transmission line to the redundant transmission line. Frames are then transmitted through the redundant transmission line having been switched to a new active transmission line.

As a third aspect of the present invention, in the redundant Ethernet transmission line system according to the above-mentioned second aspect, preferably an abnormal communication condition of the active transmission line is reported to the second transmission equipment by means of a forcible stoppage of the active transmission line operation produced by the first transmission equipment.

As a fourth aspect of the present invention, in the redundant Ethernet transmission line system according to the above-mentioned first aspect, preferably the first transmission equipment is a file server being connected to a disk unit and the second transmission equipment is a router being connected to an IP network.

As a first aspect of a transmission line switchover method for a client server system having a client system and a server system mutually connected through redundantly configured Ethernet transmission lines, preferably the method includes the following steps: In the client system, determining a failure on the active transmission line and no failure on the standby transmission line for switchover; and stopping the transmission of a link pulse from the client system to the server system; while in the server system, detecting the failure of the active transmission line by detecting the transmission suspension of link pulses; and switching over from the active transmission line to the redundant transmission line to transmit a frame to the client system.

As a second aspect of the transmission line switchover method for a client server system, preferably an Ethernet switch is provided in the client system. The transmission line switchover method according to the above-mentioned first method further includes the step of learning a frame reception port connected to the switched redundant transmission line in the Ethernet switch.

Further scopes and features of the present invention will become more apparent by the following description of the embodiments with the accompanied drawings.

BRIEF DESCRIPTION OF THE DRAWINGS

FIGS. 6A and 6B show explanation drawings of a learning function provided in Ethernet switch 15 (part 3).

FIGS. 10A and 10 show an operation of an embodiment of the present invention corresponding to FIGS. 4 to 7 (part 3).

FIGS. 11A and 11B show a switchover operation to a redundant transmission line according to the present invention when a transmission line fails (part 1).

DETAILED DESCRIPTION OF THE PREFERRED EMBODIMENTS

The preferred embodiments of the present invention are described hereinafter referring to the charts and drawings.

Figure 3:
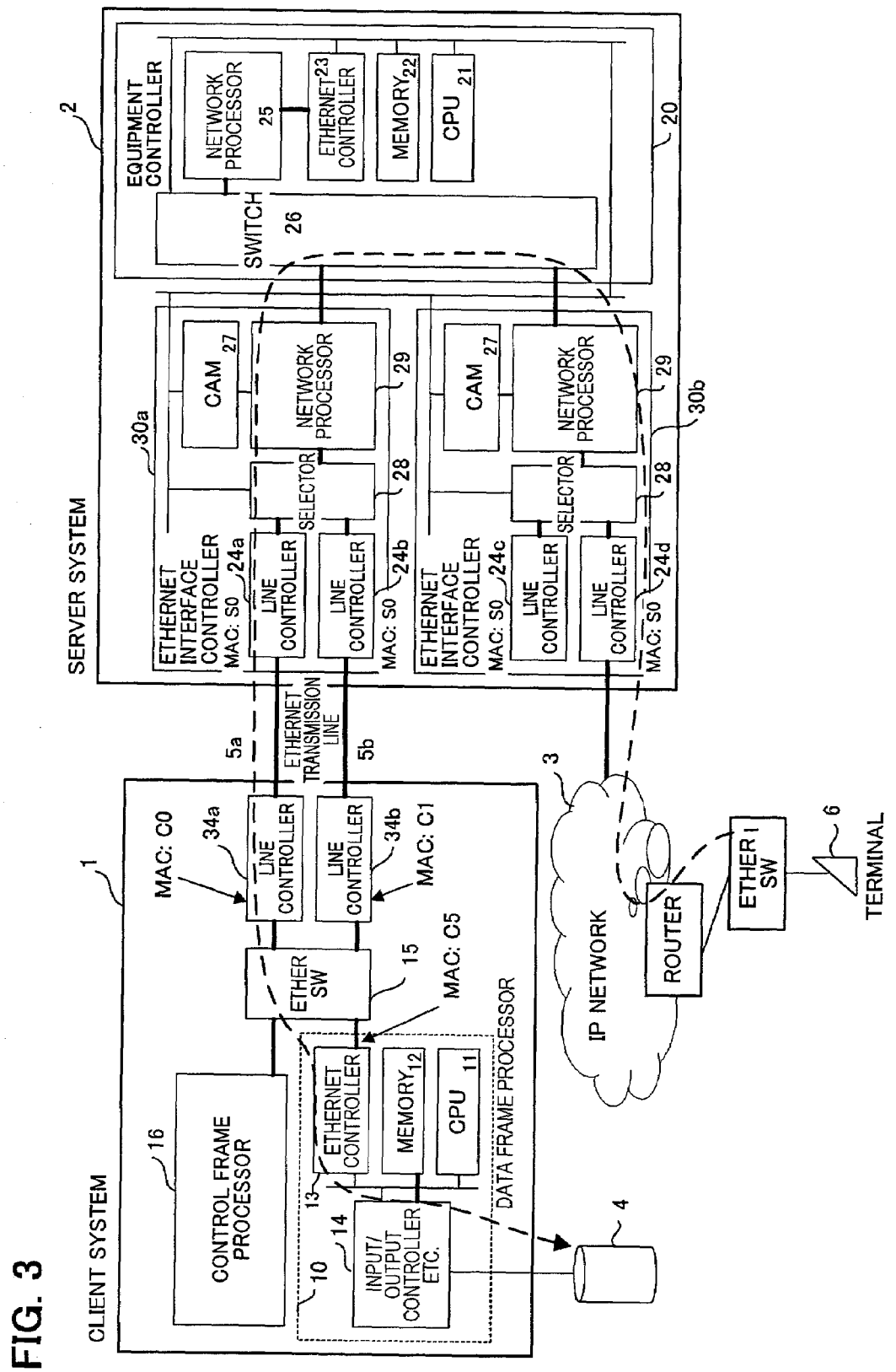
FIG. 3 shows a block diagram of an embodiment of the present invention.

In FIG. 3, a block diagram of an embodiment of the present invention is shown, in which like numerals or symbols refers to the like parts in the above-mentioned conventional redundant Ethernet transmission line system.

Figure 1:
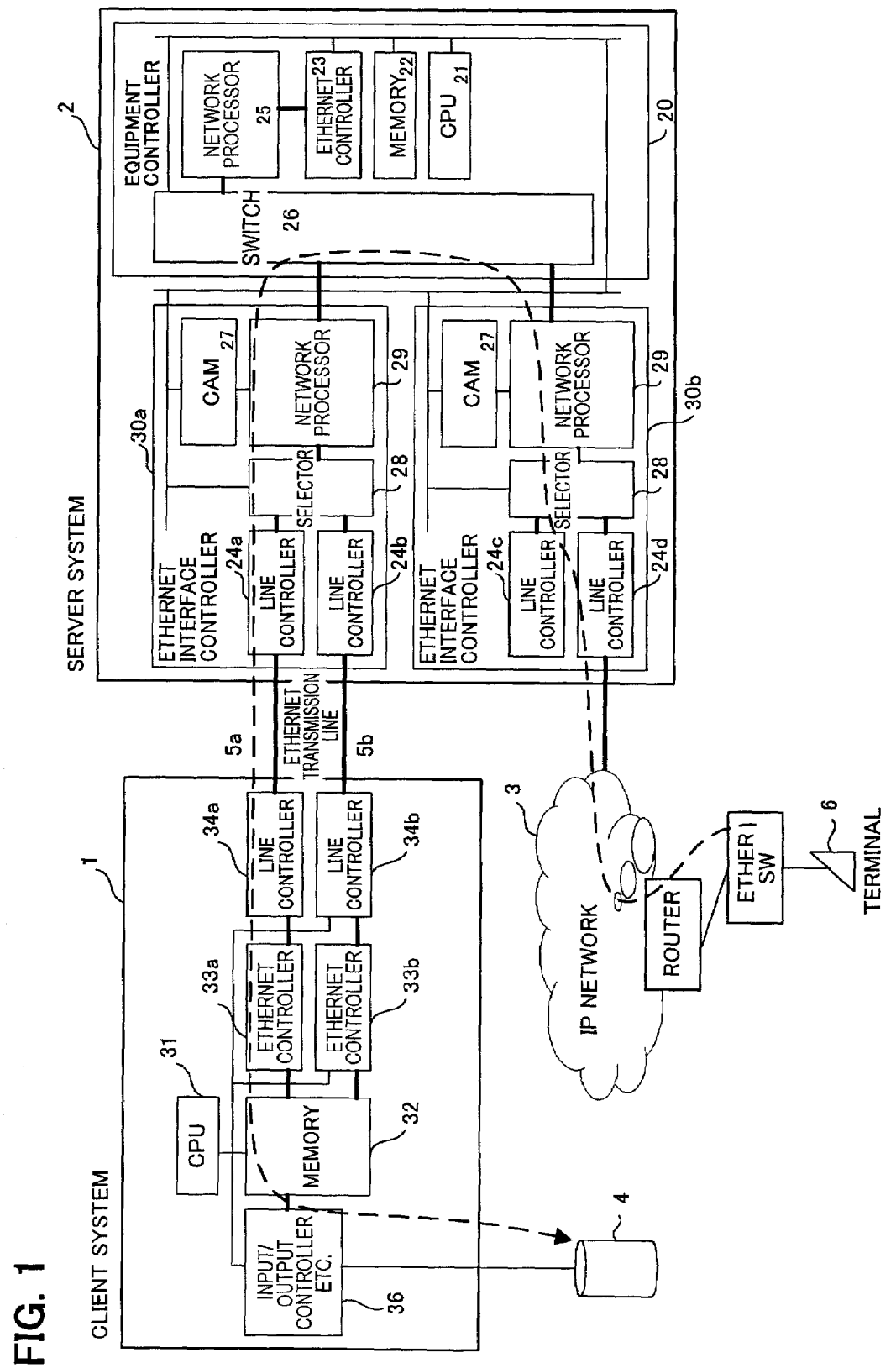
FIG. 1 shows an example of block diagram of a conventional redundant Ethernet transmission line system in a client server system.

Compared to the configuration shown in FIG. 1, the configuration in FIG. 3 has the following features: An Ethernet switch 15 is employed in client system 1. Further, a data frame processor 10 and a control frame processor 16 are individually provided, configured with an identical structure. In FIG. 3, therefore, a detailed configuration of only data frame processor 10 is shown.

Here, Ethernet switch 15 has a function of reading an address of the opposite side in a frame, and transferring the data frame to the corresponding port. Ethernet switch 15 also has a function of learning the correspondence between the MAC address and the port in the opposite side to which the frame is transferred.

FIGS. 4 to 7 are the drawings illustrating the learning function provided in Ethernet switch 15. In these figures, details of the learning function (in FIGS. 4A, 5A, 6A and 7A) as well as the corresponding learning table status (in FIGS. 4B, 5B, 6B and 7B) are shown.

Figures 4A, 4B:
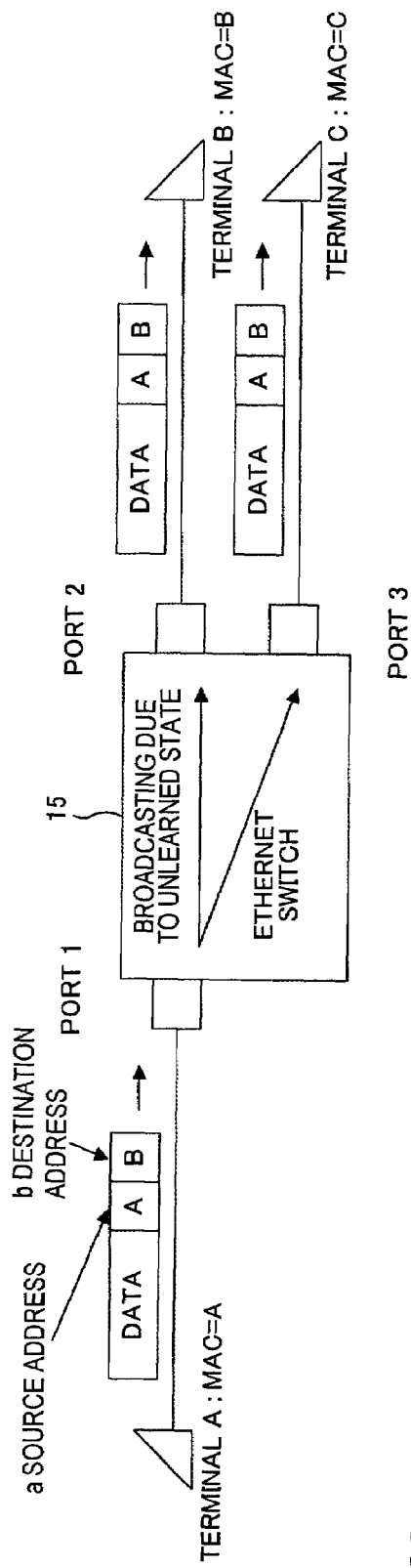
FIGS. 4A and 4B show explanation drawings of a learning function provided in Ethernet switch 15 (part 1).

FIG. 4A shows an operation of transmitting a frame from a terminal A to a terminal B while the status of the learning table (refer to FIG. 4B) is 'unlearned'. The frame includes in the header thereof a source address 'a' and a destination address 'b'.

Ethernet switch 15 broadcasts the frame to all ports excluding the source port of the frame (i.e. port #1), because Ethernet switch 15 has not learned yet in which port the destination MAC address=B exists. At this time, Ethernet switch 15 learns that MAC address=A exists in port #1 by identifying the source address 'a' (=A) in the frame.

Figures 5A, 5B:
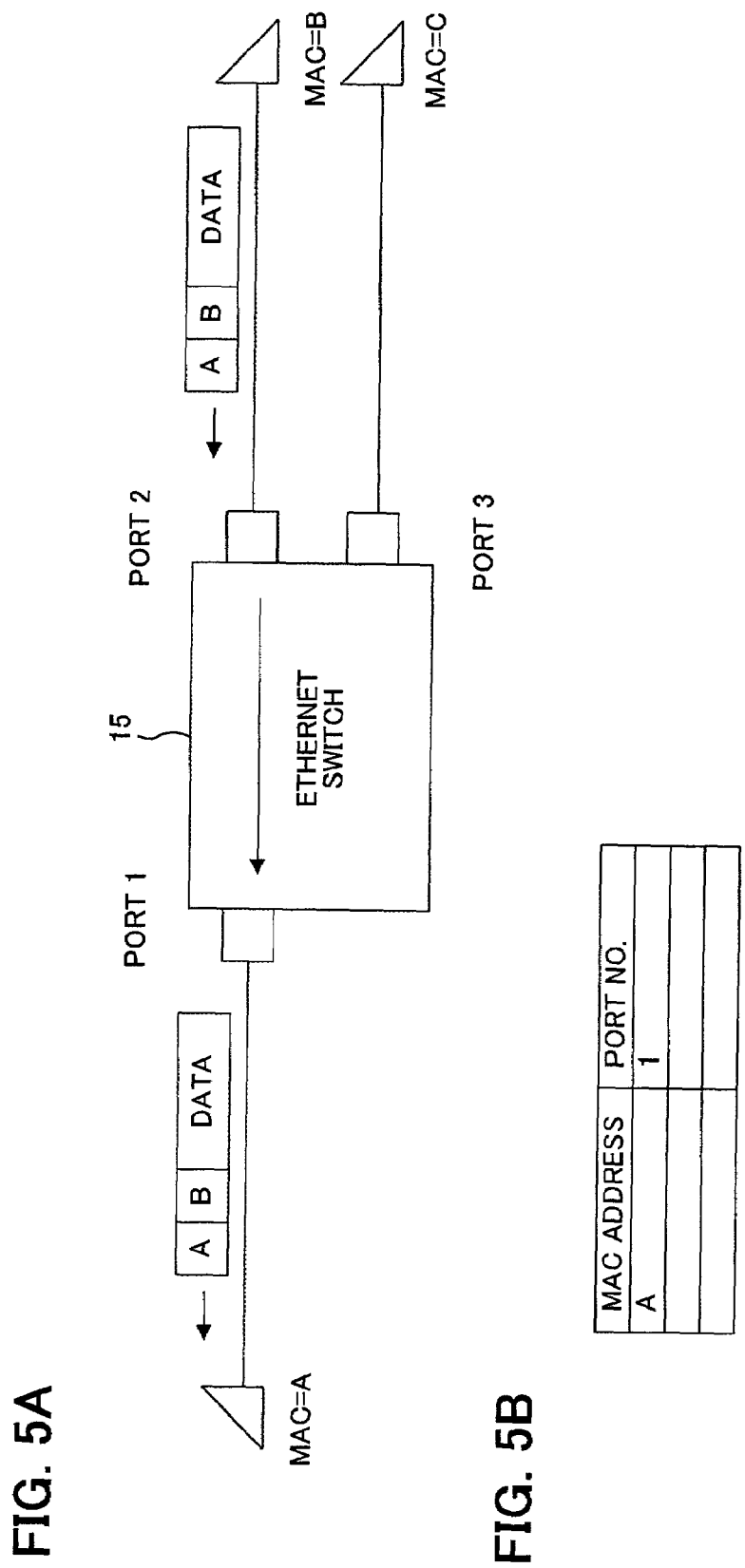
FIGS. 5A and 5B show explanation drawings of a learning function provided in Ethernet switch 15 (part 2).

Next, in FIG. 5A, there is shown an operation that, in the state that Ethernet switch 15 has learned MAC address =A (refer to FIG. 5B), Ethernet switch 15 transmits the frame from terminal B to terminal A. Ethernet switch 15 transfers the frame to port #1 only, because Ethernet switch 15 has already learned that destination MAC address=A exists in port #1 in the operation shown in FIG. 4. At this time, Ethernet switch 15 learns that MAC address=B exists in port #2 by identifying source MAC address=B in the frame.

Further, in FIG. 6A, there is shown an operation that, in the state that Ethernet switch 15 has not learned MAC address=C (refer to FIG. 6B), Ethernet switch 15 transmits the frame from terminal B to terminal C. Ethernet switch 15 broadcasts the frame to all ports excluding the source port of the frame, because Ethernet switch 15 has not learned yet in which port the destination MAC address=C exists.

Figures 7A, 7B:
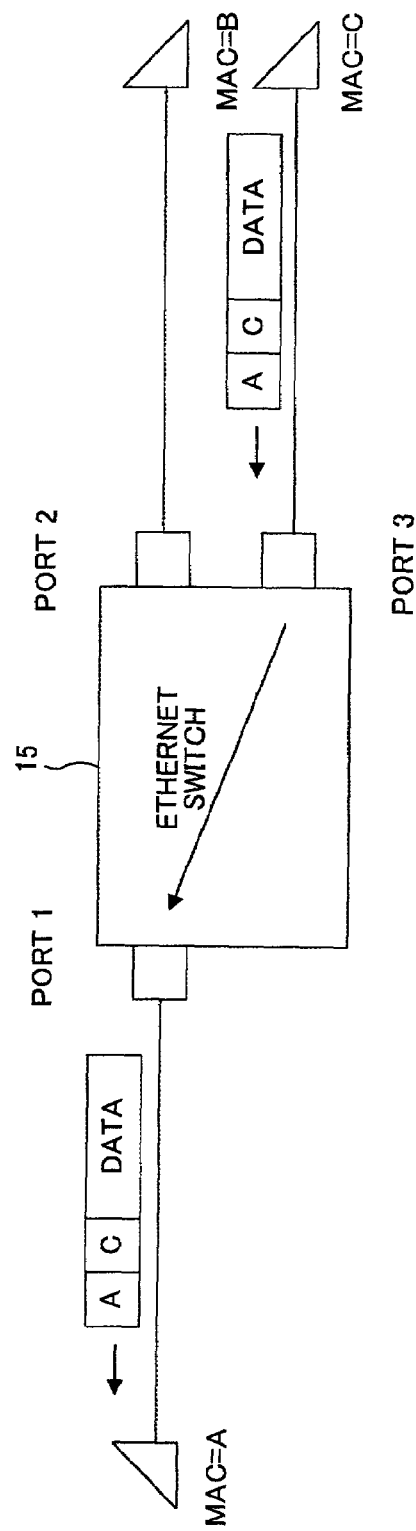
FIGS. 7A and 7B show explanation drawings of a learning function provided in Ethernet switch 15 (part 4).

In FIGS. 7A and 7B, there is shown an operation that, in the state that Ethernet switch 15 has learned MAC address =A, the frame is transmitted from terminal C to terminal A. Ethernet switch 15 transfers the frame to port #1, because Ethernet switch 15 has already learned that destination MAC address=A exists in port #1 (refer to FIG. 7B).

In such a manner, Ethernet switch 15 retains information set of the source MAC address of the received frame and the reception port (active transmission line) in the learning table.

Referring back to FIG. 3, in order to transmit a frame from client system 1 to server system 2, a destination MAC address of the destination address in the frame is determined so as to determine on which port (active transmission line; either of Ethernet transmission line 5a or 5b) the frame is to be transmitted, using learning information retained in Ethernet switch 15 of client system 1.

Server system 2 transmits the frame on working Ethernet transmission line (5a or 5b) only, using the above-mentioned operation in Ethernet switch 15. Accordingly, when transmission line switchover is required, the transmission line switchover is performed only by changing the transmission line of frame transmission without performing synchronization sequence.

When Ethernet switch 15 in client system 1 is in an unlearned state, Ethernet switch 15 broadcasts the frame to all ports (Ethernet transmission lines 5a and 5b). At this time, in order to avoid to receive the frame in duplication, server system 2 is configured so as to discard the received frame from the standby transmission line.

In FIG. 3, client system 1 is provided with a failure identification and recognition function in control frame processor 16, being performed periodically against line controllers 34a, 34b. Further, control frame processor 16 includes a function of bringing the link condition up and down by controlling line controllers 34a, 34b.

Line controllers 24a, 24b in server system 2 has a failure identification and recognition function as well as a function of bringing the link condition up and down. Network processor 29 has a function of switching over line controllers 24a, 24b for the frame transmission and reception by controlling selector 28 when line controller 24a or 24b recognizes a failure.

In server system 2, when a failure including a link stoppage condition is identified and recognized by line controllers 24a, 24b, and line controllers 24a, 24b are then switched over for the frame transmission and reception, Ethernet switch 15 in client system 1 receives frames from the new route after the switchover. Accordingly, Ethernet switch 15 can learn about the new route.

Thus, switchover of the active transmission line becomes possible between server system 2 and client system 1 without transmission or reception of control frames.

When a failure is identified and recognized in line controllers 34a, 34b in client system 1, and the failure is on the active transmission line, client system 1 controls to stop the link operation. Thus the client server system enables to switch over the active transmission line without transmission or reception of control frames.

In FIGS. 8 to 11, there is shown an embodiment of the present invention corresponding to the above description. In this example, a file server corresponds to client system 1, and a router corresponds to server system 2. In these FIGS. 8 to 11, a characteristic portion of the present invention in FIG. 3 is extracted for illustrating the operation thereof.

Figure 8A:
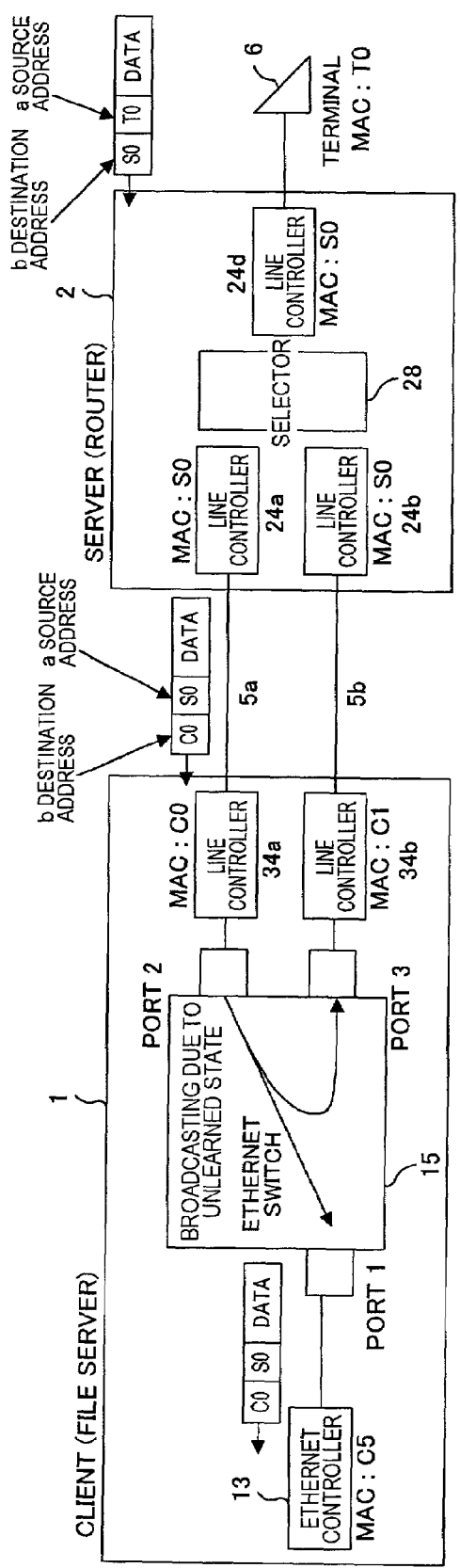
FIGS. 8A and 8B show an operation of an embodiment of the present invention corresponding to FIGS. 4 to 7 (part 1).
Figure 8B:
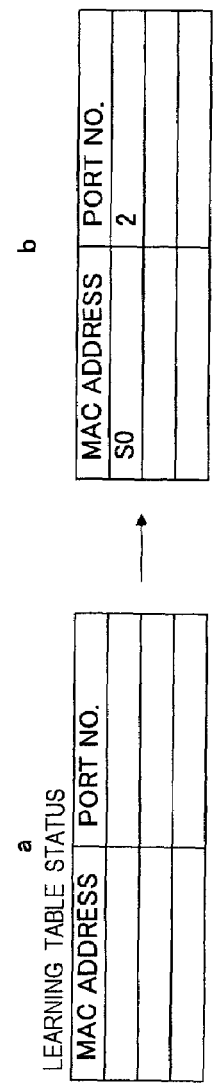

In FIG. 8A, it is assumed that the MAC addresses of line controllers 24a, 24b and 24d in server system 2 are identical (MAC: SO). When frames are transmitted or received on line controller 24a, network processor 29 controls selector 28 so as to transmit frames from line controller 24a only, and not to transmit any frame from line controller 24b. In this state, Ethernet switch 15 in client system 1 learns about the working route.

A data request is output from terminal 6 (having MAC address=T0) to client system (file server in this example) 1. In this frame, the source address is T0 and the destination address is S0.

When server system (router in this example) 2 receives the data request from terminal 6, server system 2 changes the source MAC address to MAC address=S0 of line controller 24a, and the destination MAC address to MAC address=C0 of line controller 34a, to transfer the frame toward client system (file server) 1 through Ethernet transmission line 5a.

Next, in client system (file server) 1, line controller 34a sends the frame to Ethernet switch 15 by specifying MAC address=C5 of Ethernet controller 13 as the destination MAC address.

Because server system (router in this example) 2 has not learned MAC address=C5 of Ethernet controller 13 (refer to FIG. 8B, a), Ethernet switch 15 broadcasts the data request frame to all port excluding port #2. At this time, as described earlier, Ethernet switch 15 learns the source MAC address of the frame being input to port #2 is S0 (refer to FIG. 8B, b).

Figure 9A:
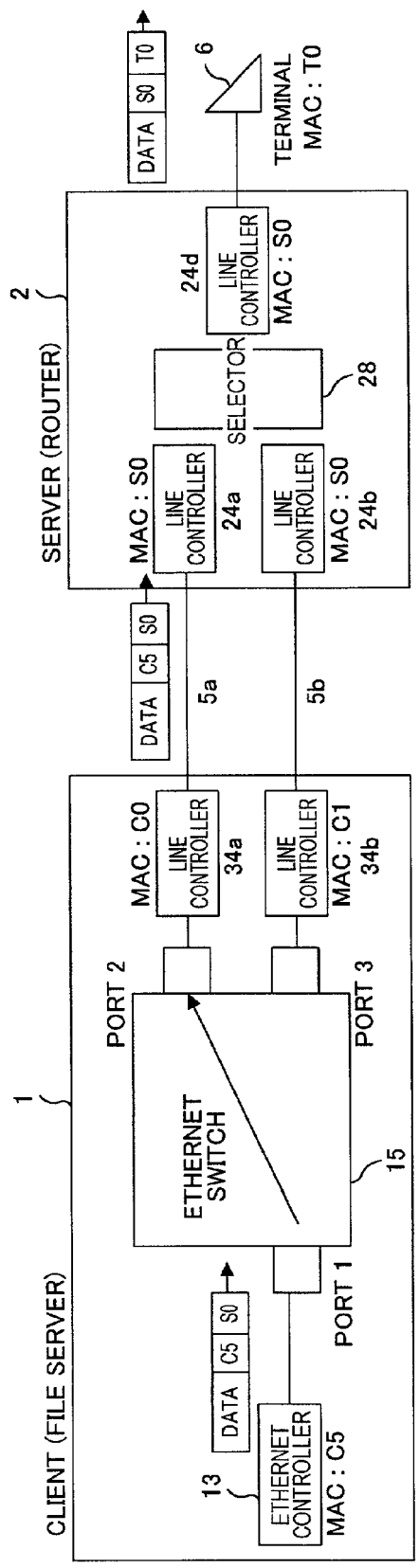
FIGS. 9A and 9B show an operation of an embodiment of the present invention corresponding to FIGS. 4 to 7 (part 2).

Next, in FIG. 9, there is illustrated a case data being sent back from client system (file server) 1 against the data request.

Ethernet controller 13 in client system (file server) 1 outputs a frame having the source MAC address=C5 and the destination MAC address=S0. Here, Ethernet switch 15 has learned the port connected to the destination MAC address=S0 corresponds to port #2 (refer to FIG. 9B, a).

Figure 9B:
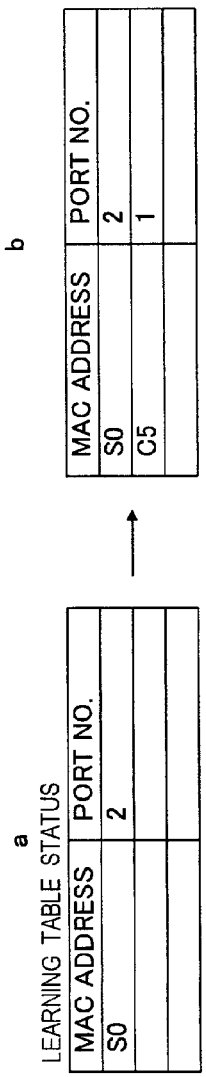

Accordingly, Ethernet switch 15 outputs a frame being input into port #1 from Ethernet controller 13 to output to port #2. At this time, Ethernet switch 15 learns that port #1 is connected to Ethernet controller 13 having MAC address=C5 (FIG. 9B, b).

Thus, as shown in FIG. 10A, after Ethernet switch 15 learned MAC address=C5 of Ethernet controller 13 (refer to FIG. 10B), the data request from terminal 6 is forwarded to port #1, instead of being broadcasted by Ethernet switch 15.

Next, during this state, a case when working Ethernet transmission line 5a fails is examined below.

Figure 2:
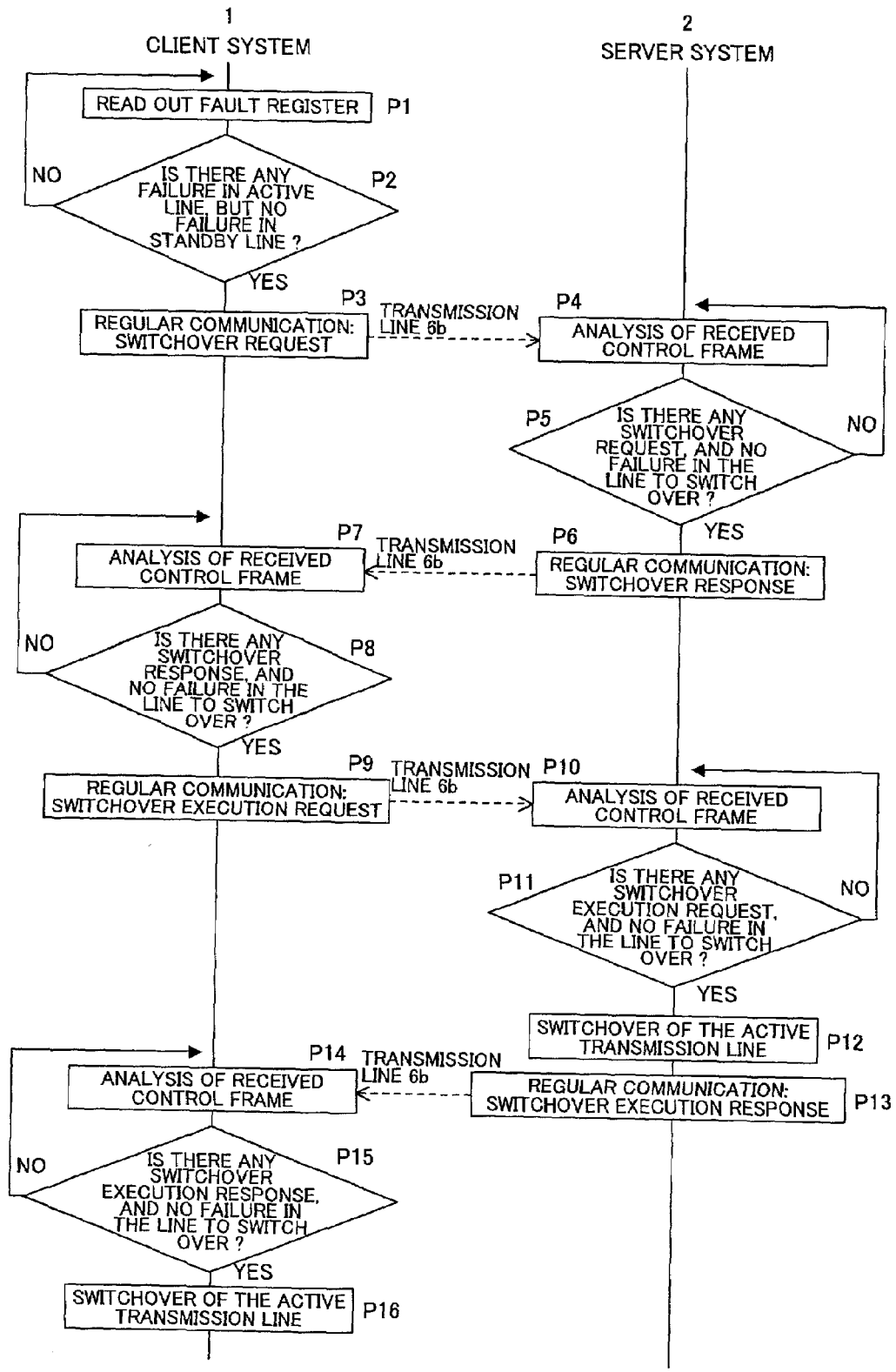
FIG. 2 shows a sequence flowchart illustrating a sequence of redundant line switchover in the conventional client server system.

In FIGS. 11, 12, explanation drawings of the operation of Ethernet switch 15 are shown. In FIG. 13, a transmission line switchover sequence according to the present invention is illustrated in comparison with FIG. 2.

Line controllers 34a, 34b in client system 1 regularly read out the contents of a non-illustrated fault register provided in line controllers 34a, 34b (procedure P20). When recognizing the active transmission line (5a) failed and the standby transmission line for switchover (5b) is normal (procedure P21; Yes), line controllers 34a, 34b suspend to transmit link pulses to server system 2 (procedure P22).

On detecting this suspension of link pulses, server system 2 reads out the fault register in line controller 24a (procedure P23), and detects a failure on the active transmission line (procedure P24).

Based on this detection, server system 2 switches over the active transmission line from transmission line 5a to transmission line b (procedure p25). Server system 2 then forwards either the data request frame received from terminal 6 or a dummy frame to Ethernet transmission line 5b having been switched over (procedure P26. Refer to FIG. 11A). At this time, Ethernet switch 15 modifies the learned contents so that MAC address=S0 is connected to port #3 (refer to a and b in FIG. 11B).

After this modification, a switch in Ethernet switch 15 is switched over (procedure P27), so that the data transmission from client system 1 side through port #1 responding to the data request is changed to forward to port #3. Thus the transmission line is switched over to Ethernet transmission line 5b (procedure P28).

Figures 12A, 12B:
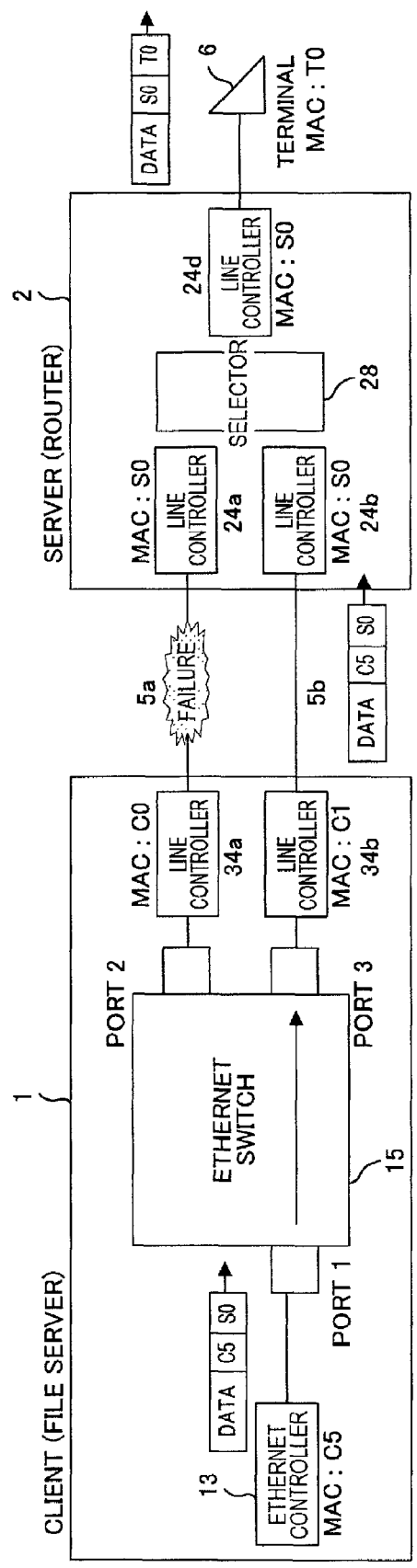
FIGS. 12A and 12B show a switchover operation to a redundant transmission line according to the present invention when a transmission line fails (part 2).
Figure 13:
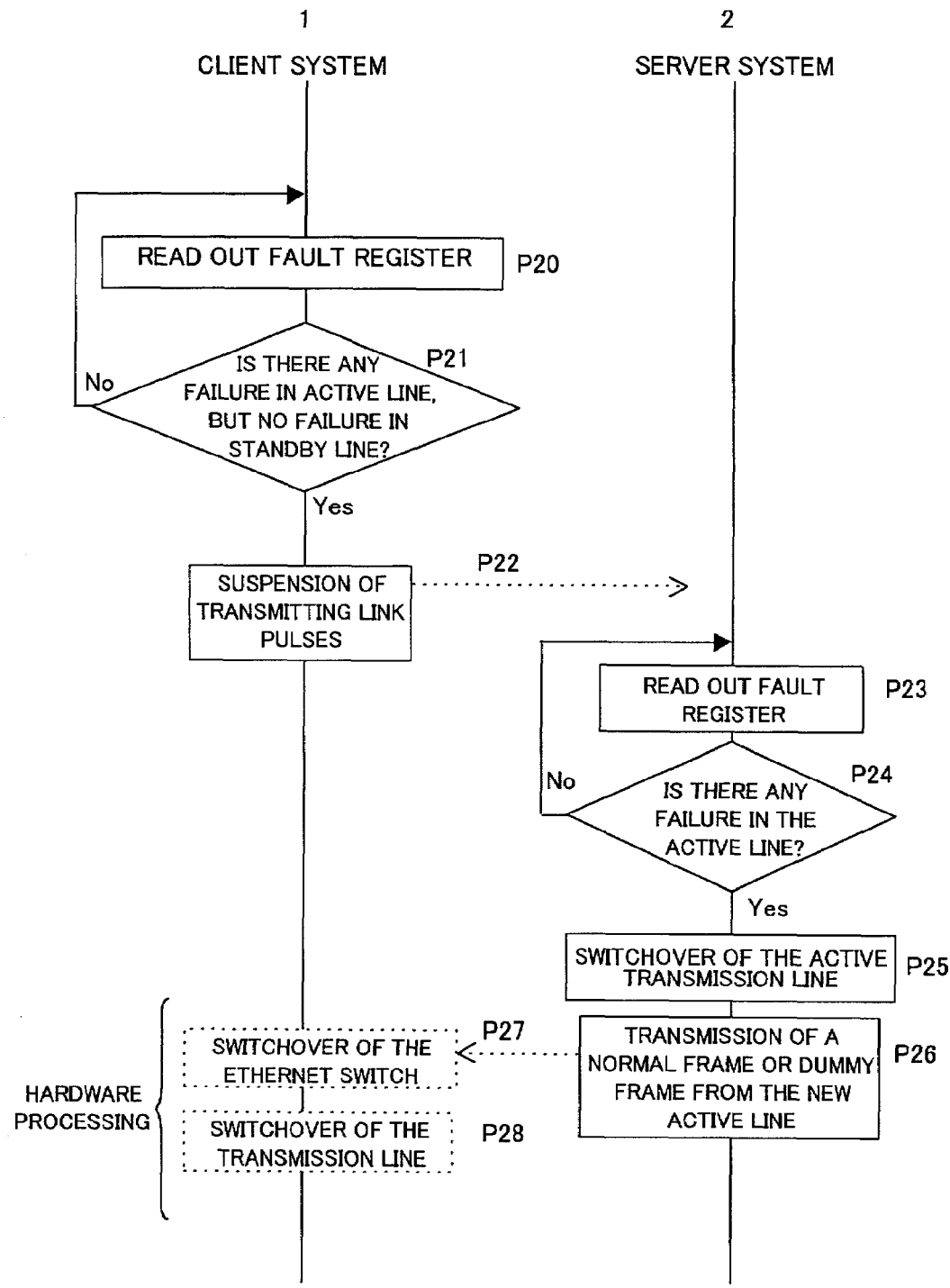
FIG. 13 shows a sequence flowchart of the switchover operation corresponding to FIGS. 11 and 12.

As shown in FIG. 12, the frame having the destination MAC address=S0 and the source MAC address=C5 is transmitted through Ethernet transmission line 5b having been switched over in accordance with the learning table (refer to FIG. 12B).

In the above description of the embodiment, selector 28 is controlled from network processor 29. However it is also possible to control from CPU 21 in equipment controller 20.

In addition, although the above embodiment is described on applying the present invention to 1:1 redundant (i.e. duplicated) configuration of transmission lines, the present invention is not limited to this application; it is also applicable to 1:n redundant configuration of transmission lines.

Also, in the above description, client system 1 is a file server being connected to disk unit 4. However, as other examples, the present invention is applicable to other cases, such as a gateway being connected to the telephone switching network, in which a redundant configuration is required.

As the embodiment has been described referring to the accompanied drawings, according to the present invention, it is possible to reduce a delay in data transmission/reception processing which may be caused by the control processing of duplicated Ethernet transmission lines. At the same time, according to the present invention, switchover time of the active transmission line can be reduced, which greatly contributes to improve the reliability of Ethernet transmission lines.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A redundant Ethernet transmission line system comprising:

Ethernet transmission lines having an active transmission line and a standby transmission line as a redundant configuration;

first transmission equipment having an Ethernet switch; and second transmission equipment connected to the first transmission equipment through the redundant Ethernet transmission lines, wherein the Ethernet switch, has a function of storing a source MAC address contained in a received frame signal and a port from which the frame signal is received in the form of a pair in a learning table, and reading a destination address of a frame signal and transferring the frame signal according to the source MAC address and the port stored in the learning table, and the Ethernet switch notifies a failure on the active transmission line to the second transmission equipment by stopping a link pulse to the second transmission equipment when the failure is detected, and wherein the second transmission equipment has a function of sending out a frame signal only through the active transmission line, and the second transmission equipment detects the failure on the active transmission line due to the stop of the link pulse from the first transmission equipment, and then the second transmission equipment sends out the frame signal through the standby transmission line so as to switch over from the failed active transmission line to the standby transmission line.

2. The redundant Ethernet transmission line system according to claim 1, wherein the second transmission equipment further includes a selector, and when the second transmission equipment detects the failure of the active transmission line, the selector switches over from the failed active transmission line to the standby transmission line so as to transmit a frame signal through the switched standby transmission line.

3. The redundant Ethernet transmission line system according to claim 1, wherein the first transmission equipment is a file server being connected to a disk unit and the second transmission equipment is a router being connected to an IP network.

4. A transmission line switchover method for a client server system having a client system and a server system mutually connected through Ethernet transmission lines having an active transmission line and a standby transmission line as a redundant configuration, comprising the steps of;

in the client system having an Ethernet switch, storing a source MAC address contained in a received frame signal and a port from which the frame signal is received in the form of a pair in a learning table;

reading a destination address of a frame signal;
transferring the frame signal according to the source MAC address and the port stored in the learning table;
determining a failure on the active transmission line and determining no failure on the standby transmission line;
notifying the failure on the active transmission line to the server system by stopping the transmission of a link pulse from the client system to the server system; and
while in the server system, detecting the active transmission line failure by detecting the link pulse transmission stoppage, and switching over from the failed active transmission line to the standby transmission line to transmit a frame to the client system.

* * * * *